United States Patent
Siol et al.

[11] Patent Number: 5,344,889
[45] Date of Patent: Sep. 6, 1994

[54] POLYSTYRENE ADHERING HEAT-SEALABLE PLASTIC FILM

[75] Inventors: Werner Siol, Darmstadt-Eberstadt; Ulrich Terbrack, Reinheim, both of Fed. Rep. of Germany

[73] Assignee: Rohm GmbH Chemische Fabrik, Darmstadt, Fed. Rep. of Germany

[21] Appl. No.: 992,098

[22] Filed: Dec. 17, 1992

[30] Foreign Application Priority Data

Dec. 21, 1991 [DE] Fed. Rep. of Germany ....... 4142692

[51] Int. Cl.$^5$ ............... C08F 255/06; C08F 263/04; C08F 265/06; C08F 279/02; C08F 283/12; B32B 27/08; B32B 1/08
[52] U.S. Cl. ..................... 525/309; 525/297; 525/305; 525/310; 525/479; 428/35.7; 428/515
[58] Field of Search ............... 525/309, 297, 305, 310, 525/479

[56] References Cited

U.S. PATENT DOCUMENTS

| | | |
|---|---|---|
| 3,645,838 | 2/1972 | Newman, Jr. et al. . |
| 4,291,090 | 9/1981 | Kenji et al. ............ 428/327 |
| 4,513,118 | 4/1985 | Suetterlin et al. . |
| 4,542,171 | 9/1985 | Elser et al. ............ 525/303 |
| 5,178,293 | 1/1993 | Suzuki et al. ........... 220/359 |

FOREIGN PATENT DOCUMENTS

| | | |
|---|---|---|
| 0254417 | 1/1988 | European Pat. Off. . |
| 0321878 | 6/1989 | European Pat. Off. . |
| 0381029 | 8/1990 | European Pat. Off. . |
| 0406681A2 | 1/1991 | European Pat. Off. . |
| 2418949 | 11/1974 | Fed. Rep. of Germany . |
| 3531036 | 3/1987 | Fed. Rep. of Germany . |
| 1354907 | 5/1974 | United Kingdom . |

OTHER PUBLICATIONS

Derwent Abstract of DE-A 3,531,036.

*Primary Examiner*—Vasu S. Jagannathan
*Attorney, Agent, or Firm*—Oblon, Spivak, McClelland, Maier & Neustadt

[57] ABSTRACT

The invention relates to a heat-sealable plastic film PF with an at least two-stage construction ranging in thickness up to 400 micrometer, that is suitable for tightly sealing plastic containers, comprising:

a) a high molecular weight or crosslinked polymer P with a molecular weight in excess of 50,000 and a glass transition point Tg of <10° C.; and b) a copolymer CP with a glass transition point Tg higher than 20° C. and where said copolymer comprises α) 20 to 80% by weight of at least one monomer of Formula I

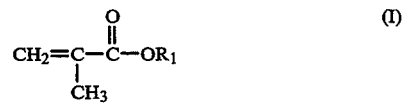

wherein $R_1$ stands for methyl or ethyl (preferably methyl);

β) 80 to 20% by weight of at least one monomer of Formula II

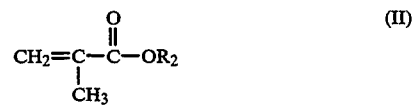

wherein $R_2$ stands for a $C_{4-18}$ alkyl residue, preferably $C_{4-12}$ or a $C_{4-12}$ cycloalkyl residue different from cyclopentyl or cyclohexyl; and γ) 0 to 10% by weight of a monomer that can be copolymerized with monomers I and II but is different from them and that is not a cyclohexyl methacrylate, with the provision that the components α), β), γ) always total 100% by weight; and wherein at least 2% by weight of said copolymer CP is covalently bound to said polymer P.

5 Claims, 1 Drawing Sheet

T: IMPACT-RESISTANT BASE
S: SMOOTHLY FLOWING SEALING LAYER

POLYSTYRENE ADHERING HEAT-SEALABLE PLASTIC FILM

BACKGROUND OF THE INVENTION

1. Field of the Invention

The invention relates to a heat-sealable plastic film with at least a two-stage structure and with a thickness ranging up to 400 $\mu$m, suitable for sealing plastic containers made, for instance, of polystyrene. The plastic film is particularly suitable for sealing containers that hold food items such as yoghurt cups.

2. Discussion of the Background

Products made of plastics are frequently used today instead of containers made of wood or such inorganic materials as metals, glass or ceramics. Requirements are always particularly high if the containers or vessels are used to hold and preserve food. A significant aspect of food preservation-whether accomplished by dehydration, freezing or sterilization, is the absolute prevention of bacterial growth. This requirement frequently calls for an airtight seal of the container. Mechanical stability, control of the moisture content, and the effects of atmosphere and of light must, moreover, also be considered for plastic containers. (See Ullmann, *Encyclopedia of Industrial Chemistry*, 25th Edition, Vol. A11, pp 523–560 and 583–618, VCH, 1988, where pertinent standards are also discussed).

Aluminum covers coated with a sealing varnish are often used to seal plastic containers, particularly if used for such dairy products as yoghurt cups.

Such aluminum covers are frequently made of a three-layered laminate, the external layer of which often consists of biaxially oriented polyethylene terapthalate (0-PET), biaxially oriented polypropylene (OPP) or polyamide (0-PA), or cellulose. The heat-sealable inner layer, on the other hand, usually consists of polyethylene, ethylene copolymers or of polypropylene (U.S. Pat. No. 4,753,708; G. Stehle, Neue Verpackung, September 91, pp 94–101) However, economic and ecological objections are increasingly being raised to the use of aluminum in food packages especially because of the high energy requirement for its production.

Plastic materials with a sealing coat are, therefore, also used instead of aluminum. The sealing coat is then adapted to the plastic material used. Polyvinyl chloride (hereinafter PVC) plays an important role here because it is a relatively cheap material for a sealing film that has good mechanical rigidity and acts as an effective barrier. The sealing coat usually consists of an acrylic resin, the adhesive character and melting point of which can be appropriately modified with additives.

However, there are some problems with the use of PVC (see Ullmann Encyclopedia, loc. cit., p. 593). Consequently, there a tendency to substitute other thermoplastic materials for disposable packages.

DE-A 3,531,036 describes plastic films that can be produced by coextrusion and consist of a sealable layer of impact-resistant polystyrene, a block copolymer and lubricant.

EP-A 0406,681, however, correctly points out the problems associated with substituting heat-sealable plastic film for aluminum foil. The significantly narrower processing range is usually a noticeable constraint. A very narrow processing range of 10°–20° C. must generally be maintained rather constantly to assure trouble-free production and the unproblematic use of the sealed container. In racking systems with several cavities for the simultaneous filling of cups, this requirement is not always met.

EP-A 0 406,681 addresses the problem of improving the procedure for producing films with a polystyrene or other base in accordance with the coextrusion system of DE-A 3,531,036 in such a way that processing range and processing reliability can be increased.

Furthermore, trouble-free production was to be assured also for filling systems with several filling cavities. In practice, this means using higher sealing temperatures with corresponding requirements concerning the quality of the plastic films.

According to EP-A 0 406,681 these requirements are satisfied by a sealable plastic film produced by a coextrusion or laminate process. Said film is composed of two layers, A and C and, if applicable, a layer B as well and optionally one layer each of a adhesion promoter D for joining each of the layers A, optionally B and C, consisting of a 1 to 50% of a layer of a heat-sealable and impact-resistant polystyrene A; up to 95% of a supporting base B; and 1 to 99% of a high melting plastic layer C, wherein the sum of the thickness or of the weight of A and, optionally B and C is always 100%.

While polystyrene as a packaging agent must be viewed favorably from the point of view of production costs and transformation requirements (110° to 160° C.), the relatively high permeability for gases and vapors can lead to problems. Although the problems created by adherence to the sealing heads can be countered by a layered construction of the sealing film with an impact-resistant polystyrene base, the solution creates increased manufacturing expenses and, possibly, waste-removal problems.

Thus, there remains the need for a suitable material for heat-sealable film. In particular, such a film should be suitable for creating an airtight seal for containers with a polystyrene base, if possible, with a homogenous layer and without additional treatment of the surface.

Above all, the film material should be environment-friendly, which means that one should be able to recycle it, even if it has a multi-layered structure.

It has now been discovered that the heat-sealable plastic films PF of the invention, although belonging to a different class of polymers, largely satisfy the technical requirements with regard to mechanical stability, chemical attributes, barrier characteristics, thermal characteristics, ease of processing (see Ullmann, Encyclopedia Vol. All, loc. cit.) and ease of recycling.

SUMMARY OF THE INVENTION

Accordingly, one object of this invention is to provide a novel heat-sealable plastic film PF with at least a two-stage construction.

A second object of the invention is to provide for a novel at least two-layered heat-sealable plastic film.

A third object of the invention is to provide for a novel plastic bond formed by a heat-sealable plastic film.

A fourth object of the invention is to provide for a novel polystyrene container sealed with a heat-sealable plastic film.

Thus, the object of the invention is provided for by a heat-sealable plastic film PF with at least a two-stage construction and a thickness ranging up to 400 $\mu$m that is suitable for sealing plastic containers, particularly those made of polystyrene, wherein the plastic film PF comprises:

a) a high-molecular weight or crosslinked polymer P with a molecular weight Mw of more than 50,000 and preferably more than 100,000 and a glass transition temperature Tg of less than 10° C., and preferably less than 0° C.; and b) a copolymer CP with a Tg of more than 20° C. comprising α) 20 to 80 percent by weight of at least one monomer of Formula I

wherein $R_1$ stands for methyl or ethyl (preferably methyl);

β) 80 to 20% by weight of at least one monomer of Formula II

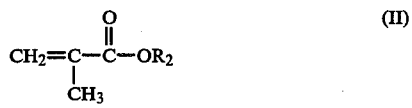

wherein $R_2$ stands for a $C_{4-18}$ alkyl residue preferably $C_{4-12}$ or a $C_{4-12}$ cycloalkyl residue, that differs from cyclopentyl or cyclohexyl; and γ) 0 to 10, preferably 0.5 to 5% by weight of a monomer, which can be copolymerized with monomers I and II but is different from them and which, as a rule, is not cyclohexyl(meth)acrylate; with the provision that the components α), γ), δ) always total 100% by weight; and wherein at least 2% by weight of copolymer P is covalently bound to polymer P.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
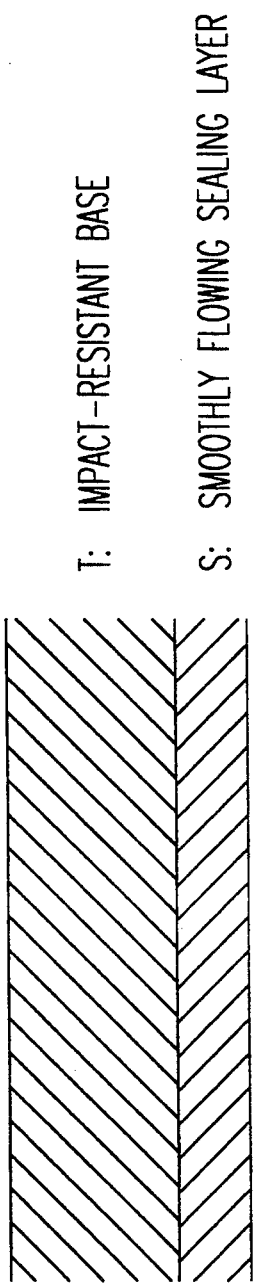
FIG. 1: Structure of a two-layer heat -sealable plastic film PF
T: High Impact strength base layer
S: Readily flowing sealing layer

Fitting under the given definition of polymers P are the known relevant elastomers (see Roempp Chemie Lexikon, 9th Edition, Vol. 2, pp. 1105–1107; Georg-Thieme Publisher).

Polymers P are appropriately selected from a group of polyolefines, polydienes, polyacrylates, ethylene-vinylacetate copolymers, polyvinyl esters, and polysiloxanes (see U.S. Pat. No. 4,906,699; Ullmann, *Enzyklopaedie der Technischen Chemie*, 4th Edition, Vol. 13, 595–635, Verlag Chemie, 1977).

Of special interest is the design of a heat-sealable plastic film PF in which the polymer is obtained by means of graft polymerization. Special mention should be made of a design in the form of a core/shell polymer wherein the polymers P should be added to the core material. The Polymers P High-molecular weight or crosslinked polymers P, by definition, have a molecular weight in excess of 50,000. A molecular weight of more than 100,000, and especially more than 200,000 and up to about 5 million, if not cross-linked is desirable, as is a glass transition point Tg of less than 0° C. Determination of the molecular weight, is done by means of gel permeation chromatography (see H. F. Mark et al, Encyclopedia of Polymer Science & Engineering, 2nd Ed., Vol. 10, pp. 1–19, J. Wiley, 1987; Ullmann, *Enzyklopaedie der Technischen Chemie*, 4th Edition, Vol. 15, pp. 207–209, Verlag Chemie, 1978). The Tg values and their determination can be obtained from the *Polymer Handbook*, J. Brandup and E. H. Immergut, editors, 3rd Ed., Vol. VI, p. 209, John Wiley, 1989 or from H. F. *Mark et al Encyclopedia of Polymer Science & Engineering*, 2nd Ed., Vol. 7, pp. 531–43, J. Wiley 1989.

By definition, polymers P have a Tg<10° C., appropriately less than 0° C. and preferably <−10° C.; this includes polymers which are usually designated as "elastomers" or "rubber." Crosslinked polymers are used if appropriate. Polymers P are preferably selected from the group of polyolefines, polydienes, polyacrylates, ethylene-vinyl acetate copolymers, and polysiloxanes.

The polyolefines are preferably homopolymers or copolymers of ethylene, propylene or isobutylene (see Ullmann, *Enzyklopaedie der Techn. Chemie*, 4th Ed. Vol. 19, S. 167–226, Verlag Chemie, 1980). The molecular weight Mw of polyolefines is generally in the range of 50,000–1,000,000 (as determined by gel permeation chromatography).

The polydienes in particular are generally known and relevant types of rubber such as polybutadienes, poly-2-chloroprenes, or polyisoprenes (see Ullmann, loc. cit., 4th Ed., Vol. 13, pp. 595–635). The molecular weight is generally in the range of 50,000–1,000,000 (as determined by gel permeation chromotography). The composition of ethylene-vinyl acetate copolymers can be varied within certain limits. The vinyl acetate content generally ranges from 40 to 75%; preferably 40 to 50%- The molecular weight is generally in the range of 100,000 to 400,000 (as determined by gpc). It is appropriately produced by solution polymerization with an average ethylene pressure of 200 to 400 bar especially when using t-butyl alcohol as a solvent. The molecular weight information of rubber types generally pertains to the molecular weight of the polymers as they are inserted during grafting in accordance with b) (that is before grafting). In one appropriate application these elastomers are cross-linked, but after the grafting in accordance with b). Here it is preferred that the elastomers are in the form of particles, wherein the diameter of these rubber particles is generally in the range of 0.05 to 10 μm; preferably of 0.2 to 5 μm. Particularly appropriate are rubber particles which show the inclusion of hard phases (see Ullmann loc. cit., Vol 13, p. 623) .

Ethylene-propylene-diene polymers (EPDM) are of particular interest (see Ullmann loc. cit. Vol. 13, pp. 619–621; Kirk-Othmer, *Encyclopedia of Industrial Chemistry*, 3rd Ed., Vol. 8, pp. 492–500, Vol. 7, pp. 687, 693, J. Wiley; for production see S. Cesca J. *Polym. Sci. Macromol*, Rev. 10, 1, 1975). As diene components dicyclopentadiene, ethylidennorbornene and trans-hexadiene-1,4 are especially recommended.

The molecular weight Mw of EPDM polymers is generally in the range of 200,000 to 500,000 (by gpc). The Tgs are given as −45° C. to −30° C. (sequence types). With an ethylene content of 45 to 60% by weight, the terpolymers are completely amorphous. For products with an ethylene content of 70 to 80% by weight, one figures on partially crystallized ethylene sequences with, on the average, 5 to 10 successive ethylene units (so-called sequence types).

Aside from EPDM polymers, EPTM polymers (ethylene-propylene-triene) may also be used. Polysiloxane (MQ, MPQ, MPVQ, according to ISO 1629, 1st Ed., 1976) should also be listed as polymers P. The commercially used silicon rubbers usually have a polydimethylsiloxane chain that has been modified by special substitutions (see Ullmann loc. cit., Vol. 13, pp. 628–663).

The types that cross-link at room temperature are polysiloxanes with a molecular weight of $10^4$ to $10^5$ (by gpc). Heat-vulcanized types, usually based on polydimethyl siloxanes (MQ), can be quickly cross-linked with rapidly decomposing diarylperoxides at elevated temperatures, e.g., at 150° C. It can be considered one of the advantages of the plastic material of the invention that commercially available polymers P can always be used for components B).

By the polyacrylates that should be used for the invention, we mean particularly those whose monomer components assure a Tg for the resulting homopolymers or copolymers of $<10°$ C., more appropriately of $<-10°$ C., and even more preferably of $<-30°$ C. The Tg is known for the homopolymers or the mixed polymers or it can be predetermined by known methods (see R. Vieweg, F. Esser *Kunststoff-Handbuch*, Vol IX, pp. 333–339, Carl Hanser Publisher, 1975; J. Bandrup, E. H. Immergut *Polymer Handbook*, III-144 to III-148, J. Wiley, 1975; Kirk-Othmer *Encyclopedia of Chemical Technology*, 3rd Ed., Vol. 1, p. 388, J. Wiley, 1978).

The polyacrylates are appropriately produced in an aqueous emulsion and sometimes also in a suspension. Especially if polyacrylates are used as polymers P, production of the polymer material by emulsion polymerization is the preferred method for the plastic film PF (see H. Rauch-Puntigan & Th. Voelker Acryl- und Methacrylverbindungen Springer Verlag 1967 pp 217–230) since this is a particularly simple way to produce plastic material with a specific particle structure. Thus, it is particularly appropriate to construct latex particles with an external shell of polymers CP which contain a rubber of crosslinked polyacrylate P on the inside. Particularly appropriate here are latex particles with at least a three-stage structure; in other words, particles which in the polyacrylate P also have a hard polymer core. Altogether these polyacrylate particles P (with embedded hard core) should have a diameter of 0.1 to 3 $\mu$m (0.2 to 1 $\mu$m is preferred). In principle, the structure of such latex particles and the isolation of the polymer solids are described by the German patent application P 3,300,256 or U.S. Pat. No. 4,513,118 and by U.S. Pat. No. 4,997,883.

In the case of emulsion polymerization, it is appropriate to work in a neutral or slightly acid pH range, wherein the use of long-chained alkyl sulfate or alkyl sulfonate as emulsifying agent is advantageous.

Appropriate initiators are known pertinent azo compounds and organic or inorganic peroxides, such as potassium persulfate, or such redox systems as, for instance, persulfate/bisulfite. In general, the initiator content is in the range of 0.001 to 1% by weight with regard to the monomers. Primarily nonionic, water-soluble dispersion stabilizers as well as organic peroxide or azo compounds, soluble in the monomers, are used for suspension polymerization (see H. Rauch-Puntigam, Th. Voelker Acryl- und Methacrylverbindungen loc. cit.). These acrylate elastomers generally also contain crosslinking monomers (e.g., allyl methacrylate) in amounts ranging from 0.1 to 5% by weight.

Core/shell polymers can be gained by the previously described two-stage emulsion polymerization process using, aside from polyacrylates, for instance, (crosslinked) polybutadiene or (crosslinked) polyvinylesters as core materials. The previously described three-stage structuring with a "hard" core can also be carried out by emulsion polymerization starting with PMMA or polystyrene, wherein the intermediate zone is appropriately constructed of an elastomer, such as polyacrylate (crosslinked), polyvinylester (crosslinked) or polybutadiene, and the shell is constructed of the polymer material CP.

The Copolymer CP

The percentage of the $\alpha$), $\beta$), and $\gamma$) monomers in the copolymers CP always supplement one another to bring the total to 100% by weight. $R_2$, by definition, stands for a possibly branched but preferably linear (unbranched) alkyl residue with at least 4 and up to 12 carbon atoms. Moreover, it is useful to follow the rule that as the number of C atoms in the $R_2$ residue increases, the relative percentage of these monomers (II) in copolymers CP should decrease. That means the relative percentage of these monomers goes in the opposite direction of the number of C atoms in the $R_2$ residue. The rule for the percentage of the monomers of Formula II of the polymer CP can be quantitatively expressed as follows (see also DE-OS 3,730,025):

$$\% \text{ (wt) monomer as in Form. II} = \frac{\text{molecular weight of the monomer of Formula I}}{\text{mol. wt of Form. I monomer} + \text{mw of Form. II monomer}} \times 100$$

To be mentioned specifically are CP, which are constructed from 20 to 80% by weight of monomers of Formula II, wherein $R_2$ stands for a linear alkyl residue such as n-butyl, n-hexyl, n-decyl as well as the alkyl residues of tallow alcohols in addition to those in which $R_2$ stands for a n-pentyl, n-hexyl, n-octyl, ethyl-hexyl, n-dodecyl, n-hexadecyl, stearyl residue. $R_2$ can also stand for a possibly substituted cycloalkyl residue except for the $C_5$–$C_6$ cycloalkyl residues which are excluded by definition.

Well suited copolymers CP for the invention could, for instance, have the composition of 50% by weight MMA/50% by weight butyl methacrylate. Also usable, for instance, are copolymers containing 70% by weight methyl methacrylate and 30% by weight n-decyl methacrylate. The above observations seem to indicate that there is a difference of two or more C atoms, and preferably three or more C atoms, between $R_1$ and $R_2$.

The copolymerization of monomers I and II can be carried out as described above.

To the extent that the polymers P with a low Tg are not linked in the form of a block copolymer with the copolymers CP, for instance, in the form of a 3-block copolymer CP-P-CP, the copolymers CP are generally not 100% covalently bonded to the polymer P. Generally the percent by weight of copolymers CP that is covalently bonded to polymer P is at least 2%, appropriately 5%, and preferably at least 10% by weight (always in relation to the copolymer CP). Such at least partial bonding of the copolymer CP to the polymer P is important for a good distribution of the polymer P in CP; most important, such good bonding creates the necessary toughness for the entire system.

The molecular weight of the copolymer CP that is not bonded to polymer P is generally limited. Thus, the molecular weight of the copolymer CP will always be in the range of 2,000 to 500,000 (Mw); 5,000 to 200,000 is appropriate and the range of 10,000 to 200,000 dalton is preferred (as determined by gpc).

The ease of processing, toughness, sealability, thermo-forming and block rigidity of the total system can be adjusted almost at will with the following parameter:
the weight ratio of P to CP (as a rule the plastic films contain 5 to 95% by weight of P, 10 to 90 is appropriate and 20 to 60% of P by weight is preferred, and 95 to 5% by weight of CP--90 to 10 is appropriate and 80 to 40% by weight of the CP is preferred).
The bonding of P to CP
The particle size of the usually cross-linked polymers P
The molecular weight of the copolymer CP
The Tg of the copolymer CP Thus, a particularly smooth-flowing material can be achieved by controlling the molecular weights of the copolymers CP with 0.1 to 2% by weight of mercaptan as a polymerization controller.

Such controlled material not only flows easily, but can also be sealed to the corresponding base (usually impact-resistant polystyrene) at relatively low temperatures (150° to 200° C.).

A particularly elegant process for producing CP-P graft polymers is (as shown above) a multistage emulsion polymerization process wherein, in the first stage, a hard core, for instance, network PMMA or polystyrene, is polymerized; in the second stage a butadiene or an acrylate such as butyl acrylate is polymerized as such or by adding a cross-linking agent to form a polymer P; and, finally, an external shell of the polymer CP is grafted onto the polymer P wherein, as shown, a part of the polymer CP is grafted onto the polymer P whereby the molecular weight of a part of polymer CP is controlled by adding 0.1 to 2% by weight of mercaptan, e.g., dodecyl mercaptan. Such emulsion polymerization particles usually have a diameter of 40 to 1,000 nm; in the case of three-stage systems, as illustrated here, the particle size (diameter) is usually in the range of 200 to 1,000 nm

The Heat-Sealable Plastic Films PF

The heat-sealable plastic films PF of the invention as such can be produced by known methods; for instance, by extrusion of the polymer material (see H. F. Mark et al *Encyclopedia of Polymer Science & Technology*, 2nd Ed., Vol. 11, pp. 269–271, J. Wiley 1988; ibid, Vol. 4, p. 816; Ullmann, *Encyclopedia of Industrial Chemistry*, Vol. All, pp. 85–111, VCH 1988; F. Hensen et al, *Handbuch der Kunststoff Extrusionstechnik*, Vol. II, Extrusion Appliances, C. Hanser-Verlag 1986).

The film's thickness, by definition, ranges up to 400 micrometer; a range of 60 to 300 $\mu$m is appropriate, and a range of 80 to 250 $\mu$m is preferred.

The plastic films PF obtained in accordance with the invention are highly suitable for solving the problems outlined in the beginning. In particular, they can be heat-sealed to a degree without creating problems (see G. Stehle, Neue Verpackung loc. cit), in this process, the processing flexibility and processing reliability should be stressed. To be emphasized is the fact that the films PF can be deep drawn, stamped, and imprinted. They have the additional advantage of allowing little permeation for such gasses as $O_2$, $CO_2$, and others. They can be dyed with good results by the usual methods of dyeing plastics (see Becker-Braun, *Kunststoff-Handbuch*, Vol. 1, pp. 539–540, Hanser, 1990).

The films also satisfy current ecological requirements since they can be recycled.

With regard to the given problem, the plastic films PF can be used advantageously for sealing plastic containers, especially those made of polystyrene and impact-resistant modified styrene. The sealable cover made of the plastic films PF of the invention fully meet the requirements established earlier in the document with regard to mechanical and chemical stability, thermal behavior and ease of processing. Although it is only a single layer material, its adhesion to polystyrene and modified polystyrene, for instance, is excellent and no significant problems are caused by adhesion to the sealing heads.

To be mentioned, for instance, is the bond between a film PF of the invention and containers which are entirely or partially constructed of polystyrene such as yogurt cups. Furthermore, there is no problem in establishing a bond to containers which have the same composition as the plastic film PF itself.

Particularly suitable for sealing cups and bowls are the plastic films PF of the invention which have at least two layers (see FIG. 1). In FIG. 1 the symbol T refers to a layer of a base material P-CP that is tough and relatively viscous; the symbol S refers to a sealing layer made of an easily flowing material P-CP or only of the copolymer CP itself. The layer T generally has a thickness ranging from 60 to 250 $\mu$m; the thickness of the sealing layer S usually ranges from 2 to 60 $\mu$m and particularly 5 to 30 $\mu$m.

Such bonded films can be produced by coextrusion of a P-CP that is made to flow easily, for instance, by strict control of the molecular weight of the CP or by keeping the P content low, onto a base material P-CP with a higher molecular weight and a larger share of P.

The sealing layer S can also be attached to the base material T by coating. In any case, the two-layered structure of the film PF has the advantage that the sealing conditions (for instance, the temperature of the sealing varnish or the pressure) can be varied within broad limits without fear that the film will stick to the hot sealing heads.

This two-layered film can also be adjusted in such a way that the stamping remnants or other film remnants can be used in toto for producing a new base film T. In that case new material is only needed for the sealing layer S since T and S can be mixed at will.

Advantageous Effects

The plastic films PF (or, respectively, the molding material from which they are made) offer, in addition to others, the following advantages as shown by the example of sealing a polystyrene cup:
The films can be sealed directly to the polystyrene
The films can be sealed with equipment generally used for heat sealing. (e.g., seal pressure below 2 bar; time requirement: 0.1 to 2 sec.; sealing temperature about 180° to 220° C.).
Films give no indication of adhering to the hot sealing head. This fact is the result of the excellent adhesion of the films to polystyrene. This is particularly true if two-layered plastic films PF are used.

The films are easily stamped

Remnants from stamping can be reprocessed into new films

The films can be printed

The films can be made to be very tough, so that the containers are impact-resistant and can be easily stacked Depending on the application, the films can be made as transparent as glass (to easily view the content) or they can be opaque-a light barrier is important, for instance, for products containing fat.

The excellent barrier effect of films, which should be polymethacrylates to have this characteristic (polymethacrylates have a permeation coefficient for oxygen and $CO_2$ that is about 100 times smaller than that of polystyrene), on the one hand, permits smaller thicknesses and, on the other hand, provides better protection of the packaged contents.

The polymethacrylate of the film cover and the polystyrene of the container are completely compatible. Thus container and cover can be recycled jointly. This holds true for single-layer and for multilayered plastic films PF.

Having generally described this invention, a further understanding can be obtained by reference to certain specific examples which are provided herein for purposes of illustration only and are not intended to be limiting unless otherwise specified.

Example 1 a) Production of the Dispersion

A two-stage emulsion polymer with a core of 50% and a shell of 50%.

50% core: Composition of the polymer P: 98% butyl acrylate, 1% allyl methacrylate 1% trimethylol propane triacrylate.

50% shell: Composition of the copolymer CP: 50% butyl methacrylate, 50% methyl methacrylate; 2nd half of the shell is controlled with 1% mercaptan.

Execution

In a glass reactor, using argon as a protective gas, 4 g tetradecane sulfonic acid-sodium salt and 0.2 mg Fe(II)-$SO_4$ are dissolved in 580 g of water and heated to 55° C. Then a mixture of 196 g butyl acrylate, 2 g allyl methacrylate, and 2 g trimethylol propane triacrylate is added and emulsified. Polymerization is then started by adding 0.4 g ammonium peroxo disulfate and 0.1 g $Na_2S_2O_5$ (always in 10 g of water). When the interior temperature has reached about 83° C., a mixture of 50 g methyl methacrylate and 50 g butyl methacrylate is added drop by drop within 30 minutes.

Then, again within 30 minutes, a mixture of 50 g methyl methacrylate, 50 g butyl methacrylate and 1 g ethyl hexyl thioglycolate is dropped in. The mixture is then stirred for an additional hour at 80° C. and allowed to cool.

A small-particle polymer dispersion is thus achieved. Solids content: 40%, particle diameter about 130 nm. b) Producing the film.

The dispersion is dried at 80° C. or, alternative, by pressing the solid gained by coagulation at low temperature or by extrusion of the solid 1a.

c) Sealing of Polystyrene Cups

A film cover is stamped out of a crystal-clear, two-stage, 0.1 mm thick polymethacrylate film produced by pressing (in accordance with b). The film cover is sealed in a hot-seal press onto the advanced polystyrene cup:
Temperature: 185° C.
Pressure: 0.8 bar
Time: 0.6 sec.

A well-sealed polystyrene cup with a crystal-clear, firmly adhering cover is the result.

d) Recycling

Film material (cover) and impact-resistant polystyrene (cup) are jointly kneaded in a graduated kneading machine (Haake Rheodrive 5000). A smoothly flowing, homogenous liquefied material that can be used for molding new cups is the result.

Example 2

A heat-sealable plastic film PF with a two-layered structure (percentages are by weight)

Base T: three-stage emulsion polymer (2a)

20% core: consisting of 99.5% MMA and 0.5% allyl methacrylate

40% 1st shell: consisting of 99% butyl acrylate and 1% allyl methacrylate

40% 2nd shell: consisting of 50% butyl methacrylate and 50% MMA. The last 75% of the 2nd shell are controlled by adding 0.5% dodecyl mercaptan (in relation to the monomers of the 2nd shell).

Particle diameter: 446 nm

The solid is gained from the dispersion by cold-coagulation. The powder resulting from the cold-coagulation process can easily be pressed into tough films. It can also be "dissolved" into organic dispersions with organic solvents and, subsequently, poured and dried to thin films.

The powder (2a) obtained by cold-coagulation is dissolved, 10% by weight is dissolved in toluene to make an organic dispersion. The 10% solution is dried into films which are subsequently pressed at 180° C. into 100 μm thick, tough films (the base T).

The two-stage emulsion polymer of example 1 (1a), obtained by cold-coagulation, is also added to toluene and dried into 20 μm-thick films (the sealing layer S).

To produce the heat-sealable two-layered plastic film PF, the base layer T and the sealing layer S are pressed for 10 minutes at 120° C. The result is a clear, tough, heat-sealable plastic film (PF2).

The two-layered plastic film thus produced is sealed with the sealing layer facing the polystyrene to the impact-resistant polystyrene under the following conditions:
Temperature: 200° C.
Pressure: 2.5 bar
Time: 2.0 seconds.

The result is a firmly adhering polystyrene/plastic film PF bond of high toughness.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A heat-sealable plastic film PF, with at least a two-stage structure and a thickness ranging up to 400 μm, suitable for tightly sealing plastic containers comprising:

a) a high molecular weight or crosslinked polymer P with a molecular weight Mw in excess of 50,000 and a glass transition point Tg of less than 10° C.; and b) a copolymer CP with a glass transition point Tg above 20° C. comprising α) 20 to 80% by weight of at least one monomer of Formula I

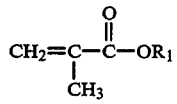

wherein $R_1$ stands for methyl or ethyl;

β) 80 to 20% by weight of at least one monomer of Formula II

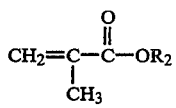

wherein $R_2$ stands for an $C_{4-18}$ alkyl residue or a $C_{4-12}$ cycloalkyl residue that is different from cyclopentyl or cyclohexyl; and γ) 0 to 10% by weight of a monomer that can be copolymerized with monomers formula I and formula II but is different from them and that is not a cyclohexyl methacrylate, with the provision that the components α), β), γ) always total 100% by weight; and wherein at least 2% by weight of copolymer CP is covalently bound to polymer P.

2. The heat-sealable plastic film PF, of claim 1, wherein said plastic film PF is constructed of a core/shell emulsion polymer that has a core of a polymer P selected from the group consisting of polybutadiene, polyacrylate, polyvinylester and a mixture thereof and a shell of the copolymer CP, wherein said core-shell emulsion polymer is produced by an at least two-stage emulsion polymerization process.

3. The heat-sealable plastic film PF of claim 1, wherein said plastic film is constructed of an at least three-stage emulsion polymer, produced by an at least three-stage emulsion polymerization process, where said emulsion polymer has 1) a generally cross-linked inner core consisting of a polyvinyl polymer with a glass transition point Tg higher than 30° C.;

2) a first shell comprising a usually crosslinked vinyl polymer of the group: polybutadiene, polyvinylester, or polyacrylate with a Tg of less than $-10°$ C.; and 3) an external shell made of the copolymer CP 4. The heat-sealable plastic film PF of claims 2 or 3, wherein the copolymer of the external shell comprises at least 20% by weight of the copolymer CP that is not bonded to the polymer P and wherein said non-bonded copolymer has a molecular weight of 2,000 to 200,000 dalton.

5. The heat-sealable plastic film PF of claim 1, comprising 5–95% by weight of polymer P and 5–95% by weight of copolymer CP.

* * * * *